D. BOWMAN.
Millstone Dress.
No. 63,360.
Patented April 2, 1867.
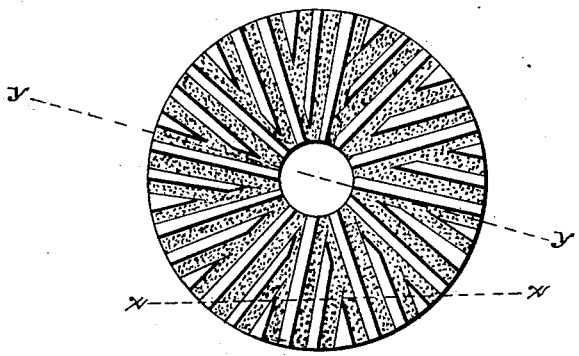
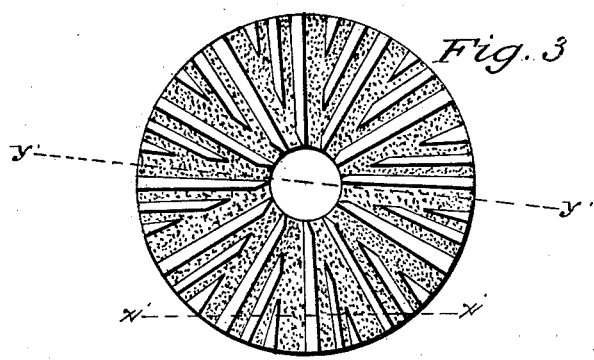
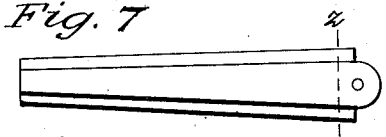
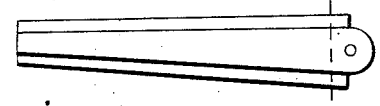
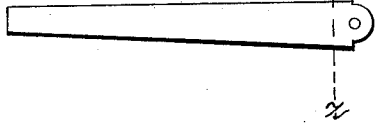
Witnesses:
Inventor:
Daniel Bowman

United States Patent Office.

DANIEL BOWMAN, OF KNOXVILLE, TENNESSEE.

Letters Patent No. 63,360, dated April 2, 1867; antedated March 28, 1867.

---

IMPROVEMENT IN MILLSTONE DRESS.

---

The Schedule referred to in these Letters Patent and making part of the same.

---

TO ALL WHOM IT MAY CONCERN:

Be it known that I, DANIEL BOWMAN, of Knoxville, in the county of Knox, and State of Tennessee, have invented a new and useful Improvement in Millstone Dress; and I do hereby declare that the following is a full, clear, and exact description thereof, which will enable others skilled in the art to make and use the same, reference being had to the accompanying drawings, forming part of this specification, in which—

Figure 1 is a view of the face of the upper stone.
Figure 2 is a vertical section of the same, on the line $x\ x$.
Figure 3 is a view of the face of the lower stone.
Figure 4 is a vertical section of the same, on the line $x'\ x'$.
Figure 5 is a vertical section of the upper stone, on the line $y\ y$.
Figure 6 is the same of the lower stone, on the line $y'\ y'$.
Figure 7 is a plan of the gauge for the furrows of the upper stone, in depth.
Figure 8 is a plan of the gauge for the furrows of the lower stone, in depth.
Figure 9 is a plan of the gauge for the furrows of both stones, in width.
Figure 10 is a section of the upper stone gauge, on the line $z\ z$.
Figure 11 is a section of the lower stone gauge, on same line.
Similar letters of reference indicate like parts.

The nature of my invention consists in dressing millstones in a different manner from the ordinary method, by which they grind nearly or quite one-third faster, grind a much larger quantity of grain before needing dressing to put them in order, heat less, and therefore deliver the flour cooler, grind the flour in fine round or granular particles without bruising or mashing it, making it lively and of superior quality. These advantages over the usual methods of dressing millstones are gained by using my mode of dressing, as has been proved by actual experiment in a number of mills.

The distinguishing features of my mode of dressing millstones are as follows: I dress the upper and the lower stones differently. The furrows of both stones are laid off alike, and may be of any pattern, either curved or straight, or divided into any number of squares, but in all cases the upper stone, whether it is used as the "runner" or not, is cut in furrows, with a deep square-edged channel in the back, and feathered to the front side, while the lower stone, in all cases, whether used as the "runner" or not, is cut in shallow furrows, of equal depth throughout. The furrows are also made broad and the "lands" very narrow, and are cut by gauges or patterns for the depth of the channels, which are made after a general rule. This rule is fixed as to the shape and proportions of the channels, though not as to measurement. For a four-foot stone the channels are cut about one-quarter of an inch in depth at the back, feathering to the front side up to the face, or, as I prefer, to within one-sixteenth of an inch, with a square edge of that depth. The channel is cut a little deeper at the circumference than at the middle, near the eye of the stone. The width of the "furrows" and "lands" is determined by this general formula: In laying off a four-foot stone with twelve master furrows with two furrows in a square, the master furrows will be one inch and an eighth at the eye and two inches and a quarter at the circumference. If the stones are larger or smaller the furrows will be wider or narrower in proportion, but they may be laid off differently, keeping the depth at the back of the furrows of the upper stone about the same and the "lands" narrow.

The governing principles of my mode of dressing the stones are illustrated in the accompanying drawings, figs. 1 and 2 showing the upper stone with the furrows cut deep in the back and feathered to the front side, and figs. 3, 4, and 6 showing the lower stone with the furrows cut shallow and of equal depth throughout. Fig. 5 shows the furrows at the back in the upper stone a little shallower at the eye than near the circumference. I lay off the furrows with a wooden pattern, fig. 9, and cut the channels of the upper stone by the gauge, figs. 7 and 10, and of the lower stone by the gauge, figs. 8 and 11. These gauges are made of hard wood, according to the rules above explained. They may be adapted to any division or pattern of the furrows, and any miller can cut the channels to fit them.

The point I make in my mode of dressing stones, especially distinguishing it from ordinary methods, is narrow "lands" combined with the different forms of the broad furrows in the upper and under stones, which narrow "lands" clean the bran sufficiently while the shallow furrows of the bed-stone do the grinding. The grain is kept in quick motion and passes rapidly through the stones without grinding any of the flour too much so as to kill the life of it, which is done by the wide "lands" of the common modes of dressing.

Having fully described my improvement in millstone dress, what I claim as new, and desire to secure by Letters Patent, is—

The millstone dress herein described, the same consisting of the upper stone, having deep square-edged channels in the back, and feathered to the front side, and the lower stone, with broad, equally shallow furrows throughout, and narrow lands, substantially as described for the purpose specified.

DANIEL BOWMAN.

Witnesses:
    H. M. AIKIN,
    R. S. HALL.